Jan. 13, 1970 J. C. O'NEAL ETAL 3,489,998
PRESSURE WARNING APPARATUS FOR A PNEUMATIC TIRE
Filed June 25, 1965
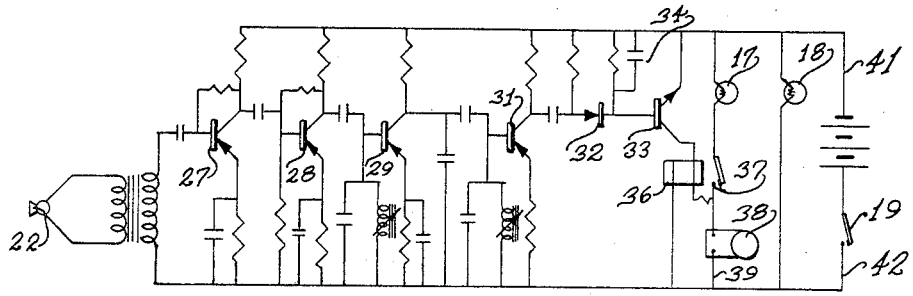
Fig 4
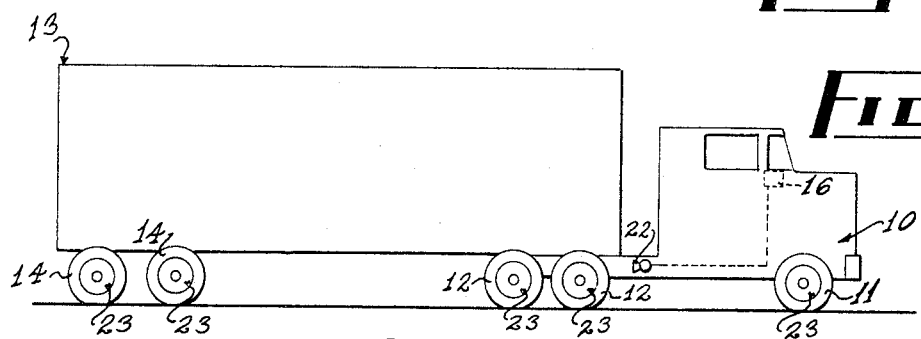
Fig 1
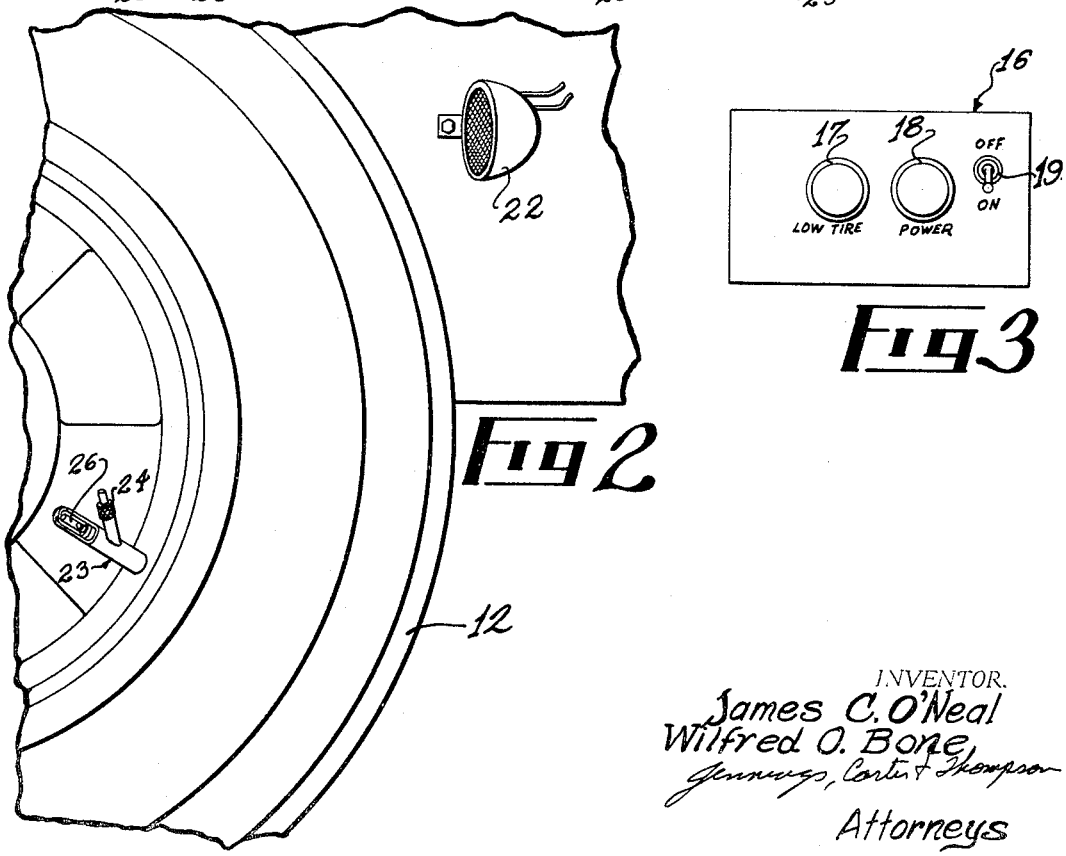
Fig 2
Fig 3
INVENTOR.
James C. O'Neal
Wilfred O. Bone
Jennings, Carter & Thompson
Attorneys

United States Patent Office 3,489,998
Patented Jan. 13, 1970

3,489,998
PRESSURE WARNING APPARATUS FOR A PNEUMATIC TIRE
James C. O'Neal, Birmingham, and Wilfred O. Bone, Montgomery, Ala.; said Bone assignor to James C. O'Neal and Earl W. Golson, Birmingham, Ala.
Filed June 25, 1965, Ser. No. 466,994
Int. Cl. B60c 23/00
U.S. Cl. 340—58    7 Claims

ABSTRACT OF THE DISCLOSURE

Apparatus carried by a vehicle to pick up a signal emitted from a low pressure warning device along with other signals. The signals picked up are amplified and all signals other than the signals emitted of a predetermined frequency from the warning device are tuned out. Current is supplied to a warning device in response to amplification of said signal of a predetermined frequency for a predetermined length of time.

---

This invention relates to pressure warning apparatus for a pneumatic tire and more particularly to such apparatus which shall be adapted for use with a tire pressure indicating device embodying means to emit a signal of a predetermined frequency upon a predetermined change in pressure within the tire, such as occurs when the tire becomes low in pressure.

An object of our invention is to provide pressure warning apparatus of the character designated which is set off only by the signal emitted at the predetermined frequency.

Another object of our invention is to provide warning apparatus of the character designated which shall be particularly adapted for use in warning when there is a predetermined decrease in pressure in the tires of a trailer pulled by a vehicle, such as a tractor, due to the fact that there are no connections between the tractor and the trailer, thus eliminating the necessity of connecting and disconnecting wires between the tractor and trailer.

Another object of our invention is to provide warning apparatus of the character designated in which road noises and other undesired signals do not interfere with operation of the apparatus due to the fact that undesirable noises and signals are tuned out and the means to actuate the warning device is operable only after the signal of a predetermined frequency has passed for a predetermined length of time from the means to tune out undesirable signals.

A still further object of our invention is to provide pressure warning apparatus for pneumatic tires which shall be extremely simple of manufacture and one which is adapted to constantly monitor every tire of a vehicle without any wire connections between the various components of the vehicle.

As is well known in the art to which our invention relates, the cost of tire failures is extremely high, especially on dual wheel trailers and the like. That is, where dual wheels are employed, if undetected, the failure of one tire will often cause the loss of both tires on the same side due to the fact that if one tire is low, the other tire must take the load causing it to flex excessively as it rolls. Accordingly, both tires become extremely hot, thus causing excessive wear and increasing the dangers of fire. As is well known, most flat tires occur while the vehicle is traveling along a highway. Accordingly, the driver is not aware of the flat until the tire is damaged and beyond repair. In an attempt to detect low tire pressure, truck and bus drivers often kick their dual tires when they stop. Although such precautions are continuously exercised, high losses continue to occur due to undetected low tire pressures.

To overcome the above and other difficulties, we provide apparatus which constantly monitors every tire of the vehicle. Upon a decrease in tire pressure below a predetermined level, a signal of a predetermined frequency is emitted by a tire pressure indicating device. An electronic indicator unit is provided within the cab and is operatively connected to a receiver which is also carried by the vehicle. When the signal of a predetermined frequency is emitted, the receiver picks up the signal. Undesirable signals are then tuned out and the signal is amplified to in turn energize an electrically actuated warning device mounted in the cab of the vehicle.

Apparatus embodying features of our invention is illustrated in the accompanying drawing, forming a part of this application, in which:

FIG. 1 is a side elevational view showing our improved pressure warning apparatus mounted on a tractor unit which pulls a trailer unit;

FIG. 2 is an enlarged, fragmental view showing a rear wheel of the tractor unit and the pick-up unit which is mounted on the tractor;

FIG. 3 is an elevational view of the indicator panel which is carried in the cab of the tractor; and FIG. 4 is a wiring diagram.

Referring now to the drawing for a better understanding of our invention, we show a tractor 10 having front wheels 11 and rear wheels 12. The tractor 10 is adapted to pull a trailer 13 having supporting wheels 14. The indicator unit indicated generally at 16 is mounted within the cab of the tractor 10 whereby it is in easy view of the operator. As shown in FIG. 3, the panel of the indicator unit 16 is provided with a light 17, such as a red light, in indicate low tire pressure. Also, an indicator light 18 is provided, such as a green light, to indicate that power is supplied to the unit. The panel is also provided with an off and on switch 19.

Mounted on the tractor 10 adjacent and rearwardly of the cab thereof is a pick-up unit 22, such as a microphone. The pick-up unit 22 is thus in position to pick up signals of a predetermined frequency which are emitted by tire pressure indicating devices 23 which are carried by each pneumatic tire of the trailer 13 and the tractor 10. The pick-up unit 22 may be of a type that will pick up signals of a predetermined frequency only whereby signals of undesired frequency are not transferred therethrough. The tire pressure indicating device 23 may be of a type that emits a signal of a predetermined frequency, such as that disclosed and claimed in O'Neal Patent No. 3,145,689. The low tire warning device 23 is attached to the valve stem of each tire. As shown in FIG. 2, the unit 23 is of a Y-shape, one branch of the Y being in the form of an ordinary valve stem having a valve therein and a cap 24. The other branch of the Y is provided with a whistle 26 which is actuated when the pressure within the tire decreases a predetermined amount.

In actual practice, we have found that on large trailer vehicles traveling at high rates of speed with the windows up it is difficult for the operator of the vehicle to hear the sound emitted by the whistle 26. To provide an instant warning to the driver of the vehicle, we mount the indicator unit 16 within the cab of the vehicle and mount the pick-up unit 22 adjacent and rearwardly of the cab whereby it is in position to pick up signals emitted by all of the wheels 11, 12 and 14 and without having to provide any wire connections between the separable units. Each whistle 26 thus serves as a transmitter when the pressure within an individual tire decreases below a predetermined amount. The microphone 22 picks up the transmitted signal of a predetermined frequency, along with other signals, whereupon it is then amplified by transistor units 27 and 28. In actual practice, we have found that a signal emitted of a frequency of approximately 4,800 cycles is satisfactory is every respect.

The amplified signal from transistor unit 28 passes through a transistor unit 29 which contains a tuning circuit which tunes out all undesired signals, such as road noises and the like. The signal then passes through a transistor unit 31 which also contains a tuning circuit that further reduces the undesirable signals. It will thus be seen that transistor units 29 and 31 are discriminator or tuning circuits which permit only the signal from the whistle 26 to pass the tuning circuits.

A diode 32 provides a D.C. signal in response to the A.C. signal which is then amplified by a transistor unit 33. A capacitor 34 is provided in circuit with the transistor unit 33 to delay or prevent sufficient current from passing to the transistor 33 to operate the same for a predetermined length of time. That is, for the transistor unit 33 to operate, it is necessary for the transistor unit 31 to pass a signal of a predetermined frequency for a sufficient length of time to charge the capacitor 34 whereby the transistor 33 is operated to in turn operate a relay 36. Accordingly, when the incoming signal overcomes the bias on transistor unit 33 it causes current to flow through the relay 36 and closes the contacts 37 of the relay 36.

As shown in FIG. 4, the warning device may be in the form of the indicator light 17 or in the form of a buzzer unit 38. If desired both the light 17 and the buzzer 38 may be employed. The contacts of the relay 37 are in circuit with a line 39 supplying current to the light 17 and the buzzer 38 whereby upon closing the contacts 37, the light 17 and the buzzer 38 are energized. The line 39 is connected to power lines 41 and 42 which supply power to the unit, as shown. The on and off switch 19 and the power light 18 are provided in the circuit, as shown in FIG. 4.

From the foregoing description, the operation of our improved pressure warning apparatus will be readily understood. With the switch 19 in the on position, the power light 18 lights up to indicate to the operator that the unit is operating. Upon a predetermined decrease in pressure in a tire of the vehicle, a signal of a predetermined frequency is emitted by the whistle 26 which in turn is picked up by the microphone 22. The signal then passes through the circuit indicated in FIG. 4 whereby the transmitted signal is amplified by the transistor units 27 and 28. Undesirable signals are then tuned out by the transistor units 29 and 31. After the signal of a predetermined frequency has passed from the transistor unit 31 for a sufficient time to charge the capacitor 34, the transistor unit 33 is operated to in turn close the contacts 37 of the relay 36 to thus energize the warning light 17 and buzzer 38. To place the system back in operation, the off and on switch 19 is actuated in the usual manner.

From the foregoing, it will be seen that we have devised an improved pressure warning apparatus which is actuated only when a signal of the predetermined freqency is emitted from the individual tire pressure indicating devices. By providing an indicating unit which is mounted on the tractor 10 without any wire connections to points adjacent the individual wheels, our improved apparatus is particularly adapted for use on trailer vehicles since there is no necessity of making and breaking wire connections between the separable units of the vehicle. Furthermore, by providing an indicator unit which constantly monitors each of the individual tires, the driver of the vehicle is warned immediately upon a predetermined reduction in pressure in any one of the tires of the vehicle.

While we have shown our invention in but one form, it will be obvious to those skilled in the art that it is not so limited, but is susceptible of various changes and modifications without departing from the spirit thereof.

What we claim is:

1. In warning apparatus for use with a tire pressure indicating device embodying air actuated sound emitting means to emit a sound signal of a predetermined frequency upon a predetermined change in pressure within a tire:
    (a) means carried by the vehicle to pick up the signal of a predetermined frequency emitted from the sound emitting means along with other signals present,
    (b) means to tune out signals other than said signal of a predetermined frequency,
    (c) means to amplify said signal of a predetermined frequency,
    (d) an electronically actuated warning device carried by said vehicle, and
    (e) means to supply current to said warning device in response to amplification of said signal of a predetermined frequency for a predetermined length of time.

2. In warning apparatus as defined in claim 1 in which means is provided to amplify the picked up signals prior to tuning out signals other than said signals of a predetermined frequency.

3. In warning apparatus as defined in claim 1 in which said means to amplify said signal of a predetermined frequency after undesirable signals have been tuned out is operatively connected to said means to tune out signals so that said means to amplify is operable only after said signal of said predetermined frequency has passed for a predetermined length of time from said means to tune out signals.

4. In warning apparatus as defined in claim 3 in which said means to amplify is operatively connected to a relay which is in circuit with said means to supply current to said warning device.

5. In warning apparatus as defined in claim 1 in which said means to pick up signals comprises a microphone carried by the vehicle.

6. In warning apparatus as defined in claim 5 in which the microphone is of a type to pick up a sound signal of a predetermined frequency only.

7. In warning apparatus for use with a tire pressure indicating device carried by a tire of a trailer pulled by a vehicle, said indicating device being disposed to emit a sound signal of a predetermined frequency upon a predetermined change in pressure within said tire,
    (a) means carried by the vehicle to pick up the sound signal emitted from the pressure indicating device along with other signals present,
    (b) means carried by said vehicle to tune out signals other than said signals of a predetermined frequency,
    (c) means carried by said vehicle to amplify said signal of a predetermined frequency,
    (d) an electronically actuated warning device carried by said vehicle, and
    (e) means to supply current to said warning device in response to amplification of said signal of a predetermined frequency for a predetermined length of time.

References Cited

UNITED STATES PATENTS

| | | | |
|---|---|---|---|
| 2,860,321 | 11/1958 | Strickland et al. | 340—58 |
| 2,894,246 | 7/1959 | De Graffenried | 340—58 XR |
| 3,333,242 | 7/1967 | Wooden | 340—58 |

ALVIN H. WARING, Primary Examiner

U.S. Cl. X.R.

116—34, 137